United States Patent
Dowd et al.

(10) Patent No.: US 9,709,178 B2
(45) Date of Patent: Jul. 18, 2017

(54) FLOW DIVERTING FLAPPER

(71) Applicant: Hamilton Sundstrand Corporation, Windsor Locks, CT (US)

(72) Inventors: Peter J. Dowd, Granby, CT (US); Donald E. Army, Jr., Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/740,952

(22) Filed: Jun. 16, 2015

(65) Prior Publication Data
US 2016/0369904 A1 Dec. 22, 2016

(51) Int. Cl.
*F16K 11/10* (2006.01)
*F16K 11/052* (2006.01)
*F16K 27/02* (2006.01)

(52) U.S. Cl.
CPC ........ *F16K 11/0525* (2013.01); *F16K 11/052* (2013.01); *F16K 27/0227* (2013.01); *F16K 27/0254* (2013.01)

(58) Field of Classification Search
USPC .......................................... 137/875; 251/298
See application file for complete search history.

(56) References Cited

U.S. PATENT DOCUMENTS

| | | | | |
|---|---|---|---|---|
| 1,514,090 A * | 11/1924 | Lewis | ............... | F16K 15/03 137/512.3 |
| 3,270,775 A * | 9/1966 | Alderson | ............... | B64C 29/0066 137/625.44 |
| 3,521,659 A * | 7/1970 | Seger | ............... | F16K 15/033 137/112 |
| 4,074,889 A * | 2/1978 | Engel | ............... | F16K 1/2028 251/298 |
| 4,822,000 A * | 4/1989 | Bramblet | ............... | F16K 5/0673 251/180 |
| 4,936,548 A * | 6/1990 | Heinemann | ............... | F16K 5/0471 251/316 |
| 5,111,839 A * | 5/1992 | Schroepfer | ............... | F16K 5/201 137/240 |
| 5,908,047 A * | 6/1999 | Nakamura | ............... | F01N 3/027 137/625.44 |
| 6,666,271 B2 | 12/2003 | Deaton et al. | | |
| 7,325,569 B2 | 2/2008 | Denike et al. | | |
| 2011/0140022 A1 | 6/2011 | Patterson et al. | | |
| 2013/0118624 A1 | 5/2013 | Burnickas | | |
| 2015/0004011 A1 | 1/2015 | Army et al. | | |

FOREIGN PATENT DOCUMENTS

| | | |
|---|---|---|
| DE | 2230244 A1 | 1/1974 |
| FR | 2908492 A1 | 5/2008 |
| JP | S6282469 U | 5/1987 |
| JP | H0680959 U | 11/1994 |

OTHER PUBLICATIONS

Extended European Search Report for EP Application No. 16174735.7, dated Feb. 1, 2017, 7 pages.

* cited by examiner

*Primary Examiner* — John Fox
(74) *Attorney, Agent, or Firm* — Kinney & Lange, P.A.

(57) ABSTRACT

A flow diverting valve includes a body having a concave spherical surface, a flange traversing a perimeter of the body, and a hinge connected to the flange and configured to rotate about a pivot axis.

18 Claims, 3 Drawing Sheets

FLOW DIVERTING FLAPPER

BACKGROUND

The present invention relates to a flow diverter assembly and more specifically to a flow diverting flapper valve used to redirect a fluid flow.

A dual purpose flapper valve assembly can be used as a diverter valve to selectively open and close both a primary flow path and a secondary flow path. The flapper valve can be positioned to cover either an inlet of the primary flow path or an inlet of the secondary flow path and can be selectively moved between the two inlets. Generally, the primary flow path can be in line with an incoming air flow and the secondary flow path can be perpendicular to the incoming air flow. Thus, when the flapper valve is positioned to close the primary flow path, the incoming air flow will strike the flapper valve before entering the secondary flow path. This can create turbulent flow near the flapper valve and cause a drop in pressure. For systems operating at low pressures (less than 1 psi), even a relatively small drop in pressure can substantially reduce air flow through the system. To maintain sufficient air flow, it can be necessary to minimize pressure drops throughout the system. One of the most significant pressure drops can generally be observed at the flapper valve assembly.

SUMMARY

In one aspect, a flow diverting valve includes a body having a concave spherical surface, a flange traversing a perimeter of the body, and a hinge connected to the flange and configured to rotate about a pivot axis.

In another aspect, a method of controlling cooling air flow for an environmental control system includes closing one of a primary flow path and a secondary flow path with a flapper valve, and directing an air flow into the other of the primary flow path and the secondary flow path, wherein directing the air flow into the secondary flow path comprises directing the air flow along a concave spherical surface of the flapper valve to cause the air flow to turn toward the secondary flow path.

In yet another aspect, a flow diverting valve assembly includes an inlet, a first flow path, a second flow path, and a flow diverting element positioned to selectively close one of the first and second flow paths. The flow diverting element includes a body having a concave spherical surface, which is positioned to direct an air flow from the inlet when the flow diverting element is positioned to close the first flow path.

The present summary is provided only by way of example, and not limitation. Other aspects of the present disclosure will be appreciated in view of the entirety of the present disclosure, including the entire text, claims and accompanying figures.

Figure 1:
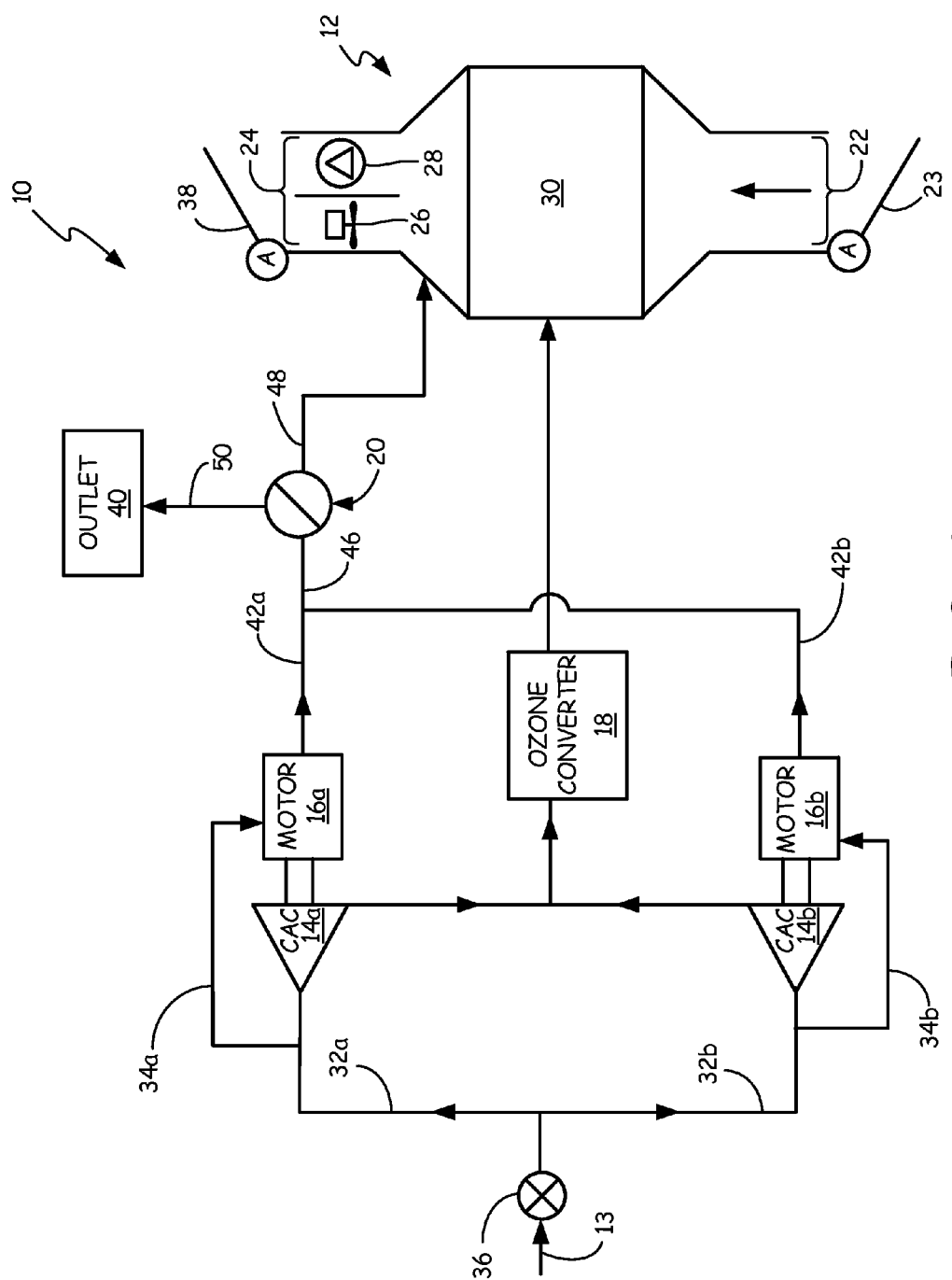
FIG. 1 is a schematic view of a portion of an environmental control system (ECS) showing cooling flow for motors of cabin air compressors (CAC).

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A spherical surface on a diverter valve can help direct an air flow to a secondary flow path when the diverter valve is positioned to close a primary flow path. The spherical surface of the diverter valve can reduce turbulence at the diverter valve and thereby help minimize a drop in pressure that could otherwise disrupt the pressure differential required to draw an air flow through a system.

The disclosed diverter valve assembly can be used to increase a flow of cooling air across a motor of a cabin air compressor (CAC) in an aircraft. FIG. 1 is a schematic view of a portion of an environmental control system (ECS) 10 of an aircraft. ECS 10 can include ram air system 12, CAC ram air inlet 13, CACs 14a, 14b, motors 16a, 16b, ozone converter 18, and diverter valve assembly 20. Ram air system 12 can additionally include ram air inlet 22, ram air actuator door 23, ram air outlet 24, ram air fan 26, check valve 28, and one or more heat exchangers (30). CACs 14a, 14b can be driven by motors 16a, 16b, respectively, to compress air for a cabin of the aircraft. Ram air can be received through CAC ram air inlet 13 and can be distributed to CACs 14a, 14b through flow paths 32a, 32b. Ram air compressed by CACs 14a, 14b can be delivered to ozone converter 18 to convert ozone to oxygen and then to heat exchanger 30 in ram air system 12 before being delivered to the aircraft cabin. A portion of the ram air from flow paths 32a, 32b can be drawn through flow paths 34a, 34b to cool motors 16a, 16b, respectively, and prevent overheating of motors 16a, 16b. In general, cooling air is drawn across motors 16a, 16b by a pressure differential existing between CAC ram air inlet 13 and ram air outlet 24 in ram air system 12. The cooling air can be modulated by actuating CAC deflector door 36 at ram air inlet 13 and actuating ram air exit door 38 at ram air outlet 24.

In the disclosed embodiment, cooling air can be drawn across motors 16a, 16b by two different modes of operation depending on whether the aircraft is on the ground or in flight. When the aircraft is on the ground, ram air fan 26 can be used to create a pressure differential across ram air inlet 13 and ram air outlet 24 and draw a cooling air flow from ram air inlet 13, across motors 16a, 16b, and out ram air outlet 24. When the aircraft is in flight, ram air exit door 38 can be substantially closed and ram air fan 26 bypassed using check valve 28. Backpressure can be created when cooling air exiting motors 16a, 16b strikes closed ram air exit door 38. Backpressure at ram air outlet 24 can reduce the amount of cooling air drawn across motors 16a, 16b. To limit the effects of closing ram air exit door 38 on motor cooling, diverter valve assembly 20 can be positioned upstream of ram air outlet 24 to divert the cooling air (heated air) exiting motors 16a, 16b to dedicated outlet 40. The positioning of diverter valve assembly 20 and dedicated outlet 40 upstream of ram air exit can increase cooling air flow across motors 16a, 16b.

When the aircraft is on the ground, cooling air can enter CACs 14a, 14b through flow paths 32a, 32b, respectively. A portion of the cooling air drawn through flow paths 32a, 32b can be drawn into flow paths 34a, 34b, respectively, to cool motors 16a, 16b. As the cooling air passes motors 16a, 16b, it can be heated. The resultant heated air can exit motors 16a, 16b into flow paths 42a, 42b, respectively. Flow paths 42a, 42b can combine to form flow path 46 before entering flow diverter valve assembly 20. Flow diverter valve assembly 20 can direct the heated air through primary flow path 48 to ram air outlet 24 and out of the aircraft.

When the aircraft is in flight, cooling air can similarly enter CACs 14a, 14b through flow paths 32a, 32b, respectively, with a portion of the cooling air being diverted to flow paths 34a, 34b to cool motors 16a, 16b, respectively. The resultant heated air flow can exit motors 16a, 16b into flow paths 42a, 42b, respectively, which combine to form flow path 46 before entering flow diverter valve assembly 20. When the aircraft is in flight, flow diverter assembly is configured to direct the heated air flow through secondary flow path 50 to dedicated outlet 40 and out of the aircraft. The use of dedicated outlet 40 can minimize or eliminate backpressure at ram air outlet 24 that can otherwise be caused by discharge of the heated air from motors 16a, 16b against ram air exit door 38.

Figure 2:
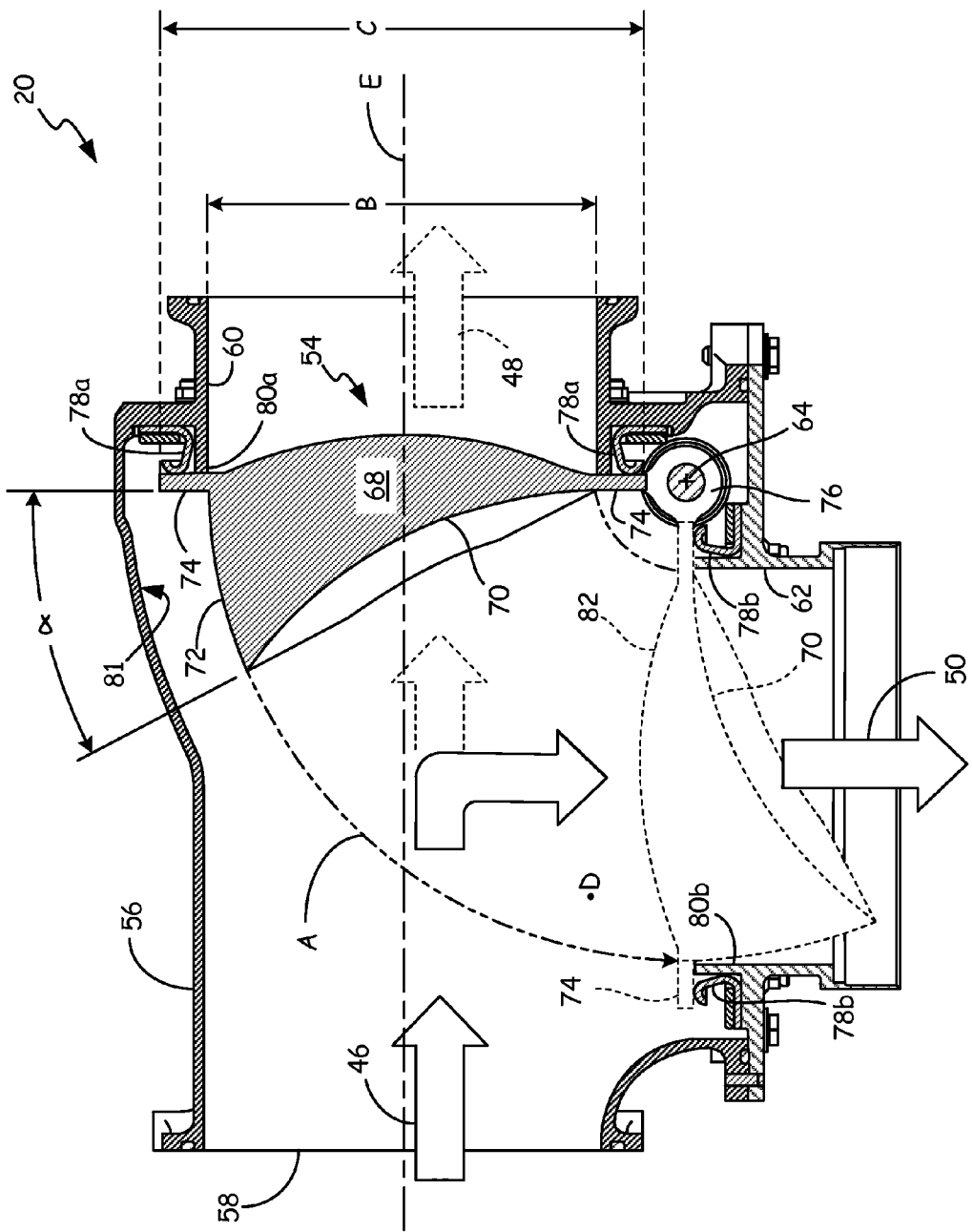
FIG. 2 is a cross-section of a flow diverter valve assembly of the ECS, with a flow diverting element shown in a primary position and a secondary position.

FIG. 2 is a cross-section of a flow diverter valve assembly 20 of the ECS 10, with a flow diverting valve 54 shown in a primary position (shown in dashed lines) and a secondary position (shown in solid lines). Flow diverter valve assembly 20 can include housing 56, inlet 58, primary flow path 48 with inlet 60, secondary flow path 50 with inlet 62, flow diverting valve 54, and actuator shaft 64. Flow diverting valve 54 can further include body 68 with spherical surface 70 and curved outer surface 72, flange 74, and hinge 76, which can include one or more hinge-type elements. Primary and secondary inlets 60, 62 can each further include seals 78a, 78b and mechanical stops 80a, 80b.

Flow diverting valve 54 can be attached to actuator shaft 64 at hinge 76 and can be moved by actuator shaft 64 to and from the primary and secondary positions to selectively open and close primary flow path 48 and secondary flow path 50. Inlet 62 of secondary flow path 50 can be positioned approximately 90 degrees from inlet 60 of primary flow path 48. Hinge 76 can be positioned adjacent to both inlet 60 and inlet 62, such that flow diverting valve 54 can move along a substantially 90 degree arc (arc A) between inlet 60 and inlet 62 to open and close primary flow path 48 and secondary flow path 50. When flow diverting valve 54 is in the primary position, secondary flow path 50 is closed, as illustrated by the dashed lines of flow diverting valve 54 in FIG. 2. When flow diverting valve 54 is in the secondary position, primary flow path 48 is closed, as illustrated by the solid lines of flow diverting valve 54 in FIG. 2. When flow diverting valve 54 is in the primary position, the heated air exiting motors 16a, 16b enters inlet 58 and flows in a substantially straight flow path into inlet 60 and to ram air outlet 24. When flow diverting valve 54 is in the secondary position, the heated air exiting motors 16a, 16b enters inlet 58 and then turns substantially 90 degrees to enter inlet 62 before flowing to dedicated outlet 40 and out of the aircraft.

Mechanical stops 80a and 80b can help prevent flow diverting valve 54 from moving past inlets 60, 62 by contacting a first or second side of flange 74. Mechanical stops 80a and 80b can form a portion of inlet 60 and inlet 62 housings, respectively, forming outer boundaries of primary flow path 48 and secondary flow path 50. Mechanical stops 80a and 80b can be configured to contact an inner diameter (B) of flange 74, which can form a substantially annular ring around body 68. Flange 74 can have an outer diameter (C) that is greater than an outer diameter of inlet 60 and inlet 62. The inner diameter (B) of flange 74 can substantially match an inner diameter of inlet 60 and inlet 62 (or mechanical stops 80a, 80b). A first side of flange 74 can contact mechanical stop 80a; a second side of flange 74 can contact mechanical stop 80b.

Seals 78a and 78b can be used to limit or prevent heated air from leaking around flange 74 and into inlet 60 when flow diverting valve 54 is positioned to close primary flow path 48 and into inlet 62 when flow diverting valve 54 is positioned to close secondary flow path 50. Seals 78a and 78b can form substantially annular rings around mechanical stops 80a and 80b, respectively. Seals 78a, 78b can be U-type face seals opening away from mechanical stops 80a, 80b and configured to deflect slightly when engaged by flange 74. Seals 78a, 78b can generally be made of silicone. Flow diverting valve 54, including flange 74, can generally be made of an aluminum alloy. However, it will be understood by one skilled in the art that other materials can be suited to the application disclosed and can be used in place of silicone and aluminum alloys. Seals 78 can be attached to the housings of inlet 60 and inlet 62 by a variety of means, including but not limited to, adhesives and mechanical fasteners, such as screws, bolts, and rivets. Alternative embodiments can include other types of face seals or sealing mechanisms capable of limiting or preventing leakage around flange 74.

When flow diverting valve 54 is in the secondary position, closing primary flow path 48, body 68 directs air flow entering housing 56 toward inlet 62 and secondary flow path 50. Body 68 is configured to direct the heated air substantially 90 degrees toward inlet 62 in a manner that minimizes turbulence and a related pressure drop. A perimeter of body 68 can be generally circular to match a shape of inlets 60 and 62. A thickness of body 68 can form a wedge-like shape with a thickness that is greatest at an outer end opposite hinge 76 and tapering down toward hinge 76. Body 68 can have curved outer surface 72 at the outer end. Curved outer surface 72 can extend outward from flange 74 along arc A into housing 56. Flange 74 upward from curved outer surface 72 toward an inner diameter of housing 56 when flow diverting valve 54 is positioned to close primary flow path 48. A portion (81) of housing 56 can have a curvature substantially matching a curvature of outer curved surface 72 to accommodate flange 74 when flow diverting valve 54 moves between the primary and secondary positions. Curved outer surface 72 can extend outward from flange to accommodate spherical surface 70, which can be positioned on an inner side of flow diverting valve 54. In one embodiment, curved outer surface 72 can extend outward from flange 74, such that an outermost point of curved outer surface 72 is separated from flange 74 by an angle (a) between 30 to 40 degrees measured from a point where body 68 meets flange 74 at hinge 76. The distance which outer curved surface 72 extends from flange 74 can be varied to accommodate varying flow dynamics. Ideally, outer curved surface 72 should extend only so far as needed to accommodate the needed orientation of spherical surface 70 and should not significantly interrupt flow path 46.

Spherical surface 70 can cover a full side of body 68. Spherical surface 70 can be a concave surface positioned to interact with the heated air when flow diverting valve 54 is positioned to close primary flow path 48. Spherical surface 70 generally can have a radius of curvature that is greater than the inner diameter (B) of flange 74 (and inlets 60, 62 and mechanical stops 80a, 80b), and less than the outer diameter (C) of flange 74. Additionally, the radius of curvature can be less than a radius of curvature of curved outer surface 72. A center of a sphere (D) forming spherical surface 70 can be located between the center line (E) of flow path 46 and secondary flow path inlet 62 when flow diverting valve 54 is in the secondary position, such that spherical surface 70 is oriented at a downward angle toward inlet 62. Generally, the center (D) can be located closer to inlet 62 and inside of arc A when flow diverting valve 54 is in the secondary position. By orienting spherical surface 70 toward inlet 62, spherical surface 70 helps direct the heated air from flow path 46 toward inlet 62. Spherical surface 70, thereby, helps minimize the pressure drop caused by turbulence at an intersection of flow path 46 and flow diverting valve 54. Although the radius of curvature of spherical surface 70 has been defined in relation to other features of the flow diverter assembly 20 in the disclosed embodiment, it will be understood by one skilled in the art that the radius of curvature can be modified to optimize system fluid dynamics and that the relationships described herein may not be necessary to achieve optimum flow in alternative embodiments. Additionally, the center of the sphere can be moved closer to or farther from the center line (E) of flow path 46 as needed to optimize flow.

When flow diverting valve 54 is in the primary position, flow diverting valve 54 is positioned to close secondary flow path 50 at inlet 62. As shown in FIG. 2, a majority of body 68, including curved outer surface 72 can nest inside of inlet 62. A portion of body 68 that remains in flow path 46 can have can have a convex spherical surface 82, which can extend a relatively small amount into flow path 46 as compared to the portion of body 68 that extends into inlet 62. Convex spherical surface 82 can be used to accommodate spherical surface 70, providing additional material thickness, which can be particularly needed where spherical surface 70 nears hinge 76 and the thickness of body 68 is most reduced. In alternative embodiments, Convex spherical surface 82 can be modified as needed to improve air flow into primary flow path 48. For instance, a flat surface could replace convex spherical surface 82 or convex spherical surface 82 could be modified at or near hinge 76 to direct air flow into primary flow path inlet 60.

Figure 3:
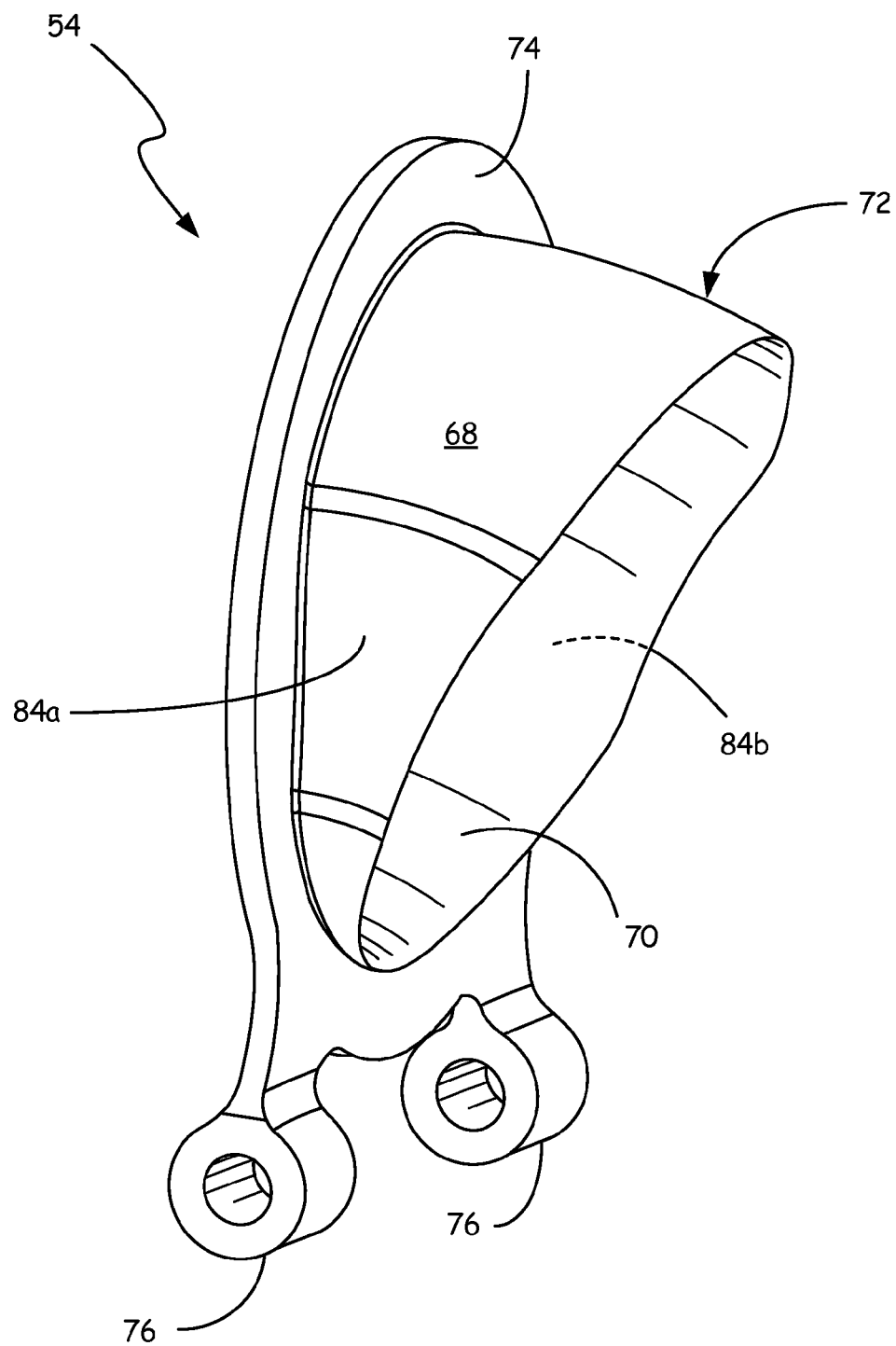
FIG. 3 is a perspective view of the flow diverting element.

FIG. 3 is a perspective view of flow diverting valve 54, showing body 68, spherical surface 70, curved outer surface 72, flange 74, hinge 76, and side walls 84a, 84b. Body 68 can generally form a circle along the flange 74 with a curved circumferential surface extending outward from flange 74. To reduce material use, body 68 can be reduced in shape to form side walls 84a and 84b positioned opposite one another as shown in the embodiment illustrated in FIG. 3. Side walls 84a, 84b can have a substantially flat surface. Side walls 84s, 84b generally do not impact the fluidic functionality of flow diverting valve 54, but can be incorporated to reduce material usage and weight of flow diverting valve 54.

In the embodiment shown in FIG. 3, hinge 76 includes two hinge elements spaced apart from one another and extending from flange 74. Hinge 76 can be configured to hold shaft 64 (See FIG. 2) of an actuator (not shown). It will be understood by one skilled in the art that other types of connection mechanisms can be used move flow diverting valve 54 between the primary and secondary positions and that the present invention is not limited to the hinge-style connection illustrated in FIGS. 2 and 3.

Flow diverting valve 54 with spherical surface 70 can help direct an air flow to a secondary flow path, reduce turbulence at flow diverting valve 54, and thereby help minimize a drop in pressure that could otherwise disrupt the pressure differential required to draw cooling air across motors 16a, 16b. Although flow diverting valve 54 is disclosed for a particular application, it will be understood by one skilled in the art that the configuration of flow diverting valve 54 in combination with flow diverter valve assembly 20 can be utilized in a variety of systems, and is particularly adapted to those operating at low pressures.

Discussion of Possible Embodiments

The following are non-exclusive descriptions of possible embodiments of the present invention.

A flow diverting valve includes a body having a concave spherical surface, a flange traversing a perimeter of the body, and a hinge connected to the flange and configured to rotate about a pivot axis.

The flow diverting valve of the preceding paragraph can optionally include, additionally and/or alternatively, any one or more of the following features, configurations and/or additional components:

The flow diverting valve of the preceding paragraph, wherein the body further includes a first end adjacent the flange near the hinge, and a second end opposite the first end. The second end extends outward from the flange along a curved trajectory, forming a curved outer surface.

The flow diverting valve of the preceding paragraph, wherein the concave spherical surface of the body has a radius of curvature that is less than a radius of curvature of the curved outer surface of the body.

The flow diverting valve of the preceding paragraph, wherein the second end has a thickness that is greater than a thickness of the first end and wherein a thickness along the body tapers from the second end to the first end.

The flow diverting valve of the preceding paragraph, wherein an outermost point of the second end extends outward from the flange at an angle between 30 and 40 degrees from a point where the first end and flange intersect.

The flow diverting valve of the preceding paragraph, wherein the body further includes a first sidewall, and a second sidewall. The first and second sidewalls are positioned between the first and second ends and have a flat outer surface.

The flow diverting valve of the preceding paragraph, wherein a radius of curvature of the concave spherical surface is less than an outer diameter of the flange but greater than an inner diameter of the flange.

The flow diverting valve of the preceding paragraph, further including an inlet, a first flow path, and a second flow path. The flow diverting valve is positioned to selectively close one of the first and second flow paths. The concave spherical surface is positioned to direct an air flow from the inlet when the flow diverting valve is positioned to close the first flow path.

The flow diverting valve of the preceding paragraph, wherein the concave spherical surface has a radius of curvature that is greater than a diameter of the each of the first and second flow paths.

The flow diverting valve of the preceding paragraph, wherein the first and second flow paths further include a first and a second inlet, respectively, and wherein the curved outer surface of the flow diverting valve is stowed within the second inlet when the flow diverting element is positioned to close the second flow path.

A method of controlling cooling air flow for an environmental control system includes closing one of a primary flow path and a secondary flow path with a flapper valve, and directing an air flow into the other of the primary flow path and the secondary flow path, wherein directing the air flow into the secondary flow path comprises directing the air flow along a concave spherical surface of the flapper valve to cause the air flow to turn toward the secondary flow path.

The method of the preceding paragraph, wherein closing the secondary flow path includes stowing the concave spherical surface of the flapper valve in an inlet of the secondary flow path.

A flow diverting valve assembly includes an inlet, a first flow path, a second flow path, and a flow diverting element positioned to selectively close one of the first and second flow paths. The flow diverting element includes a body having a concave spherical surface, which is positioned to direct an air flow from the inlet when the flow diverting element is positioned to close the first flow path.

The flow diverting valve of the preceding paragraph can optionally include, additionally and/or alternatively, any one or more of the following features, configurations and/or additional components:

The flow diverting valve of the preceding paragraph, wherein the concave spherical surface has a radius of curvature that is greater than a diameter of the each of the first and second flow paths.

The flow diverting valve of the preceding paragraph, wherein the flow diverting element further includes a flange and a hinge. The flange traverses a perimeter of the body. The body has a first end and a second end opposite the first end. The second end extends outward from the flange, creating a thickness at the second end that is greater than a thickness at the first end a thickness along the body tapers from the second end to the first end. The hinge is connected to the flange near the first end and configured to rotate about a pivot axis.

The flow diverting valve of the preceding paragraph, wherein an outermost point of the second end extends outward from the flange between 30 and 40 degrees from a point at which the flange and the first end intersect.

The flow diverting valve of the preceding paragraph, wherein the second end extends from the flange on a curved trajectory, thereby creating a curved outer surface, and wherein a radius of curvature of the curved outer surface is greater than a radius of curvature of the concave spherical surface.

The flow diverting valve of the preceding paragraph, wherein the inlet further includes a housing. A section of the housing includes a curved inner surface with a radius of curvature substantially matching the radius of curvature of the curved outer surface of the flow diverting element. The curved inner surface and the curved outer surface are aligned when the flow diverting element is positioned to close the first flow path. The curved outer surface is stowed within an inlet of the second flow path when the flow diverting element is positioned to close the second flow path.

The flow diverting valve of the preceding paragraph, wherein the second flow path is substantially 90 degrees from the inlet, such that air flow in the second flow path is substantially perpendicular to the air flow in the inlet.

The flow diverting valve of the preceding paragraph, wherein each of the first and second flow paths further includes an inlet and an annular seal positioned to engage the flange when the flow diverting element is positioned to close one of the first and second flow paths. The annular seal comprises a U-shaped ring configured to compress when engaged by the flange.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flow diverting valve comprising:
   a body having a concave spherical surface and comprising:
      a first end; and
      a second end opposite the first end;
   a flange traversing a perimeter of the body; and
   a hinge connected to the flange and configured to rotate about a pivot axis;
   wherein the first end is adjacent the flange near the hinge and the second end extends outward from the flange along a curved trajectory, forming a curved outer surface, and wherein the concave spherical surface of the body has a radius of curvature that is less than a radius of curvature of the curved outer surface of the body.

2. The flow diverting valve of claim 1, wherein the second end has a thickness that is greater than a thickness of the first end and wherein a thickness along the body tapers from the second end to the first end.

3. The flow diverting valve of claim 2, wherein an outermost point of the second end extends outward from the flange at an angle between 30 and 40 degrees from a point where the first end and flange intersect.

4. The flow diverting valve of claim 2, wherein the body further comprises:
   a first sidewall; and
   a second sidewall, wherein the first and second sidewalls are positioned between the first and second ends and have a flat outer surface.

5. The flow diverting valve of claim 1, wherein a radius of curvature of the concave spherical surface is less than an outer diameter of the flange but greater than an inner diameter of the flange.

6. The flow diverting valve of claim 1, further comprising:
   an inlet;
   a first flow path; and a second flow path; wherein the flow diverting valve is positioned to selectively close one of the first and second flow paths, and wherein the concave spherical surface is positioned to direct an air flow from the inlet when the flow diverting valve is positioned to close the first flow path.

7. The flow diverting valve of claim 6, wherein the concave spherical surface has a radius of curvature that is greater than a diameter of the each of the first and second flow paths.

8. The flow diverting valve of claim 6, wherein the first and second flow paths further comprise a first and a second inlet, respectively, and wherein the curved outer surface of the flow diverting valve is stowed within the second inlet when the flow diverting element is positioned to close the second flow path.

9. A method of controlling cooling air flow for an environmental control system, the method comprising:
 closing one of a primary flow path and a secondary flow path with a flapper valve the flapper valve comprising:
  a body having a concave spherical surface, wherein the concave spherical surface is positioned to direct an air flow from the inlet when the flow diverting element is positioned to close the first flow path;
  a flange traversing a perimeter of the body, wherein the body has a first end and a second end opposite the first end, the second end extending outward from the flange, creating a thickness at the second end that is greater than a thickness at the first end, and wherein a thickness along the body tapers from the second end to the first end; and
  a hinge connected to the flange near the first end and configured to rotate about a pivot axis; and
 directing an air flow into the other of the primary flow path and the secondary flow path, wherein directing the air flow into the secondary flow path comprises directing the air flow along the concave spherical surface of the flapper valve to cause the air flow to turn toward the secondary flow path.

10. The method of claim 9, wherein closing the secondary flow path comprises:
 stowing the concave spherical surface of the flapper valve in an inlet of the secondary flow path.

11. A flow diverting valve assembly comprising:
 an inlet;
 a first flow path;
 a second flow path; and
 a flow diverting element positioned to selectively close one of the first and second flow paths, wherein the flow diverting element comprises:
  a body having a concave spherical surface, wherein the concave spherical surface is positioned to direct an air flow from the inlet when the flow diverting element is positioned to close the first flow path;
  a flange traversing a perimeter of the body, wherein the body has a first end and a second end opposite the first end, the second end extending outward from the flange, creating a thickness at the second end that is greater than a thickness at the first end, and wherein a thickness along the body tapers from the second end to the first end; and
  a hinge connected to the flange near the first end and configured to rotate about a pivot axis.

12. The flow diverting valve assembly of claim 11, wherein the concave spherical surface has a radius of curvature that is greater than a diameter of the each of the first and second flow paths.

13. The flow diverting valve assembly of claim 11, wherein an outermost point of the second end extends outward from the flange between 30 and 40 degrees from a point at which the flange and the first end intersect.

14. The flow diverting valve assembly of claim 11, wherein the second end extends from the flange on a curved trajectory, thereby creating a curved outer surface, and wherein a radius of curvature of the curved outer surface is greater than a radius of curvature of the concave spherical surface.

15. The flow diverting valve assembly of claim 14, wherein the inlet further comprises:
 a housing, wherein a section of the housing comprises a curved inner surface with a radius of curvature substantially matching the radius of curvature of the curved outer surface of the flow diverting element, and wherein the curved inner surface and the curved outer surface are aligned when the flow diverting element is positioned to close the first flow path, and wherein the curved outer surface is stowed within an inlet of the second flow path when the flow diverting element is positioned to close the second flow path.

16. The flow diverting valve assembly of claim 11, wherein the second flow path is substantially 90 degrees from the inlet, such that air flow in the second flow path is substantially perpendicular to the air flow in the inlet.

17. The flow diverting valve assembly of claim 11, wherein each of the first and second flow paths further comprises:
 an inlet; and
 an annular seal positioned to engage the flange when the flow diverting element is positioned to close one of the first and second flow paths, and wherein the annular seal comprises a U-shaped ring configured to compress when engaged by the flange.

18. A flow diverting flapper valve comprising:
 a body having a concave spherical surface and including:
  a first end; and
  a second end opposite the first end;
 a flange traversing a perimeter of the body, wherein the second end extends outward from the flange, creating a thickness at the second end that is greater than a thickness at the first end, and wherein a thickness along the body tapers from the second end to the first end; and
 a hinge connected to the flange near the first end and configured to rotate about a pivot axis.

* * * * *